(12) United States Patent
Jessberger et al.

(10) Patent No.: US 6,450,140 B1
(45) Date of Patent: Sep. 17, 2002

(54) DRUM CONTROLLER

(75) Inventors: Thomas Jessberger, Rutesheim; Helmut Neuschwander, Ludwigsburg; Klaus Rentschler, Gaeufelden, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/529,952

(22) PCT Filed: Oct. 20, 1998

(86) PCT No.: PCT/EP98/06608
§ 371 (c)(1),
(2), (4) Date: Aug. 22, 2000

(87) PCT Pub. No.: WO99/20879
PCT Pub. Date: Apr. 29, 1999

(30) Foreign Application Priority Data

Oct. 21, 1997 (DE) .......................... 197 46 217

(51) Int. Cl.⁷ ............................................. F02B 75/22
(52) U.S. Cl. .............................. 123/184.53; 123/184.55
(58) Field of Search ........................ 123/184.55, 184.53

(56) References Cited

U.S. PATENT DOCUMENTS

| | | | | |
|---|---|---|---|---|
| 5,829,403 A | * | 11/1998 | Suzuki et al. | 123/184.55 |
| 5,901,677 A | * | 5/1999 | Ohrnberger et al. | 123/184.55 |
| 6,073,601 A | * | 6/2000 | Guichard et al. | 123/184.55 |
| 6,176,213 B1 | * | 1/2001 | Arnegger | 123/184.55 |
| 6,216,657 B1 | * | 4/2001 | Paffrath et al. | 123/184.53 |
| 6,267,091 B1 | * | 7/2001 | Nishida et al. | 123/184.55 |
| 6,279,528 B1 | * | 8/2001 | Happenhofer et al. | 123/184.53 |

* cited by examiner

Primary Examiner—Noah P. Kamen
Assistant Examiner—Jason Benton
(74) Attorney, Agent, or Firm—Crowell & Moring LLP

(57) ABSTRACT

A drum controller for use in the induction system of a multi-cylinder internal combustion engine includes an induction distributor and individual induction pipes arranged next to each other and ending in a flange. The controller is arranged in a longitudinal bore hole of the individual induction pipes and is used to pen and close said tubes. The drum controller includes a moveable sleeve and a fixed core. The individual induction pipes are opened or closed when the sleeve is rotated.

8 Claims, 4 Drawing Sheets

DRUM CONTROLLER

Figure 1:
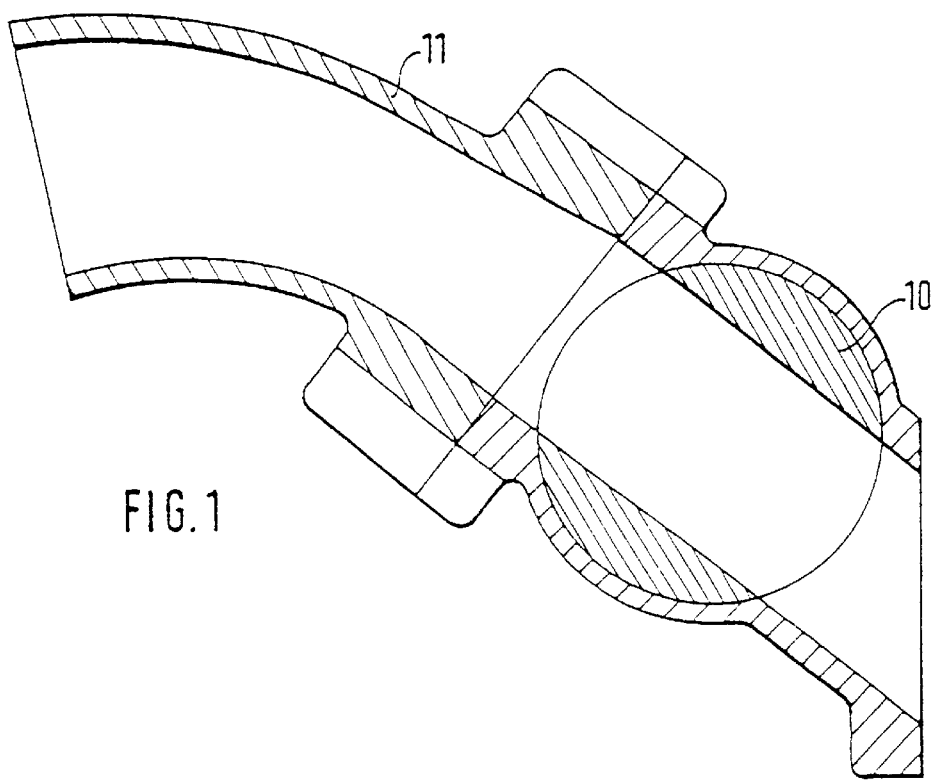

The invention relates to a drum controller, especially for use in an air induction duct apparatus for a multiple-cylinder internal combustion engine, according to the preamble of claim 1 and the preamble of claim 5.

In an induction duct apparatus according to EP B 0 177 794, single induction ducts are combined with a combination induction duct in a single unit to which, as an additional component, an air intake manifold is flange-mounted, which is in communication on the one hand with the combination induction duct through a throttle valve and on the other hand with the single induction ducts. The second single induction ducts can be shut or opened by flap valves which are disposed on shafts which pass through the air intake manifold. This known induction duct apparatus is comparatively complicated to make and presents problems with regard to trouble-free cooperation of the flap valves mounted in the air intake manifold with the second single intake ducts disposed in a different component part.

An induction duct apparatus for a multiple cylinder internal combustion engine is disclosed in DE A 42 44 504. The intake apparatus has a tubular intake manifold from which first single intake ducts depart, which extend in an arc around the intake manifold and lead to the individual cylinders of the two rows of cylinders. Second, shorter single intake ducts likewise depart from the intake manifold and lead into the corresponding single intake ducts. The intake manifold and the first and second single intake ducts are formed by a one-piece component which has a longitudinal bore. A drum controller is inserted into the longitudinal bore and has an opening for each second single intake duct which by rotation of the drum controller can be brought into or out of alignment with the particular second single intake duct. It has been found that such a drum controller produces turbulence in the air intake. This turbulence leads in certain states of engine operation to a loss of power in the multiple-cylinder internal combustion engine. The turbulence is disadvantageous especially where the drum controller extends through all of the air intake ducts and produces a great change in the shape of the duct in the intake ducts which are not closed by the drum controller but must remain open.

The invention is therefore addressed to the problem of creating a drum controller which avoids the disadvantages described, is easy to manufacture, and has no adverse effect on the air intake.

This problem is solved, setting out from the preamble of claim 1, by the distinctive features thereof.

The advantage of the invention is that the drum controller consists of two components. It consists on the one hand of a moving control barrel, and on the other hand of a fixed core, while the opening and closing of the single intake duct is performed by the rotation of the control barrel. The fixed core has the purpose of optimizing the flow-affecting shape of the single intake duct.

According to an embodiment of the invention the fixed core is connected at least at one end to the intake manifold. A plug-in joint or a screw connection, for example, is suitable for fastening the core. In the area of the single intake ducts the fixed core is supported by appropriate bearing points or bearing areas, and indirectly by the drum controller. The drum controller, which extends over all the single intake ducts, is provided with openings in the individual ducts which must not be closed, such that both in the closed position and in the open position the shape of the flow of the open single intake duct is not impaired.

An alternative solution to the problem calls for providing the drum controller with valves, the drum controller and valve system being attached by a mounting part to the intake manifold. This design is especially simple and is characterized in that here too the drum controller has but a slight effect on the air flow in the single ducts that are not to be closed.

The mounting part can, according to an advantageous embodiment of the invention, be joined to an intermediate intake duct flange. Both the fastener and the drum controller valve combination can be pre-mounted and thus can be built economically into the intake manifold.

These and additional features of preferred embodiments of the invention will be found not only in the claims but also in the description and the drawings, the individual features being applicable individually or severally in the form of subcombinations in the embodiment of the invention and in other fields and may represent advantageous as well as independently patentable embodiments, for which protection is hereby claimed.

The invention is explained below with the aid of embodiments.

FIG. 1 shows a section through an end flange of an air intake manifold

Figure 2:
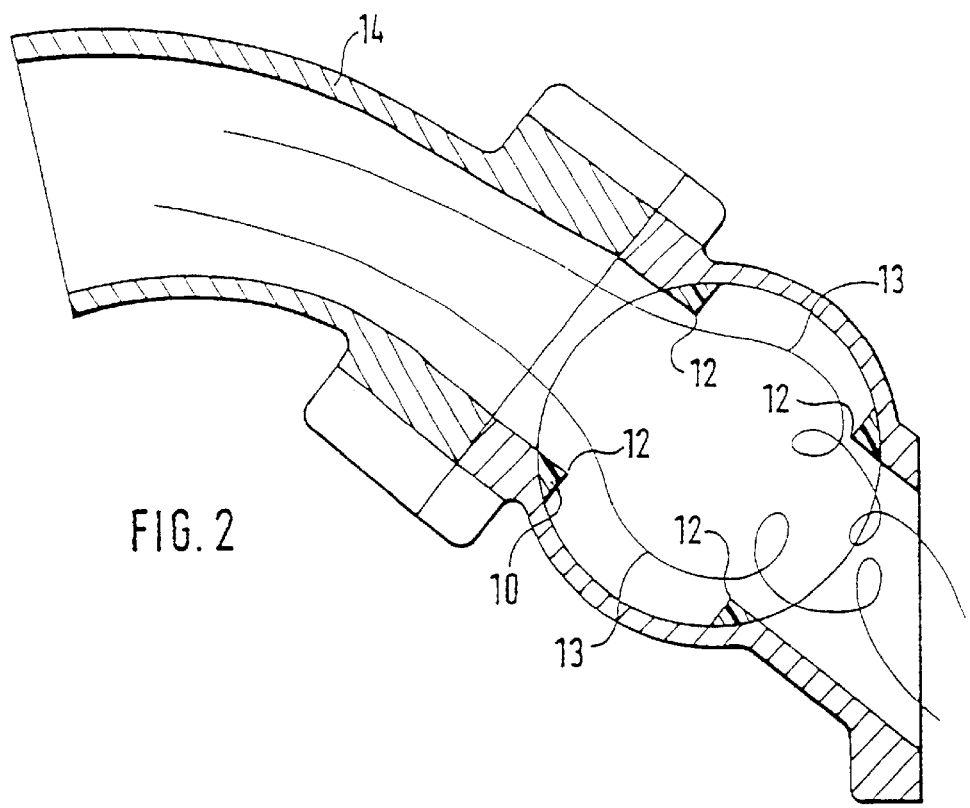
Figure 3:
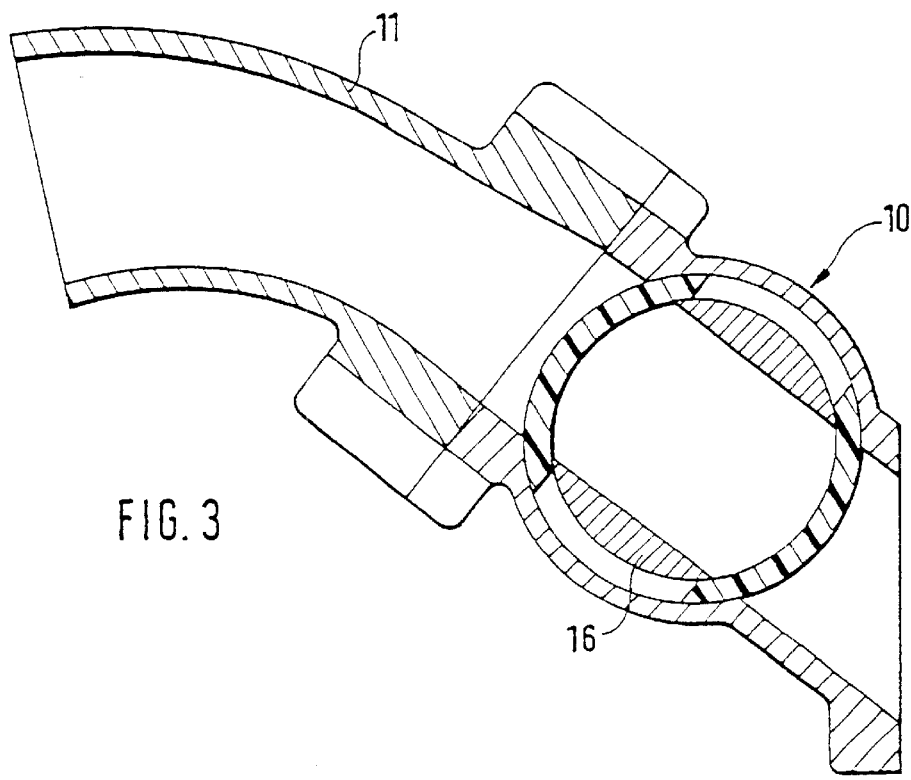
Figure 4:
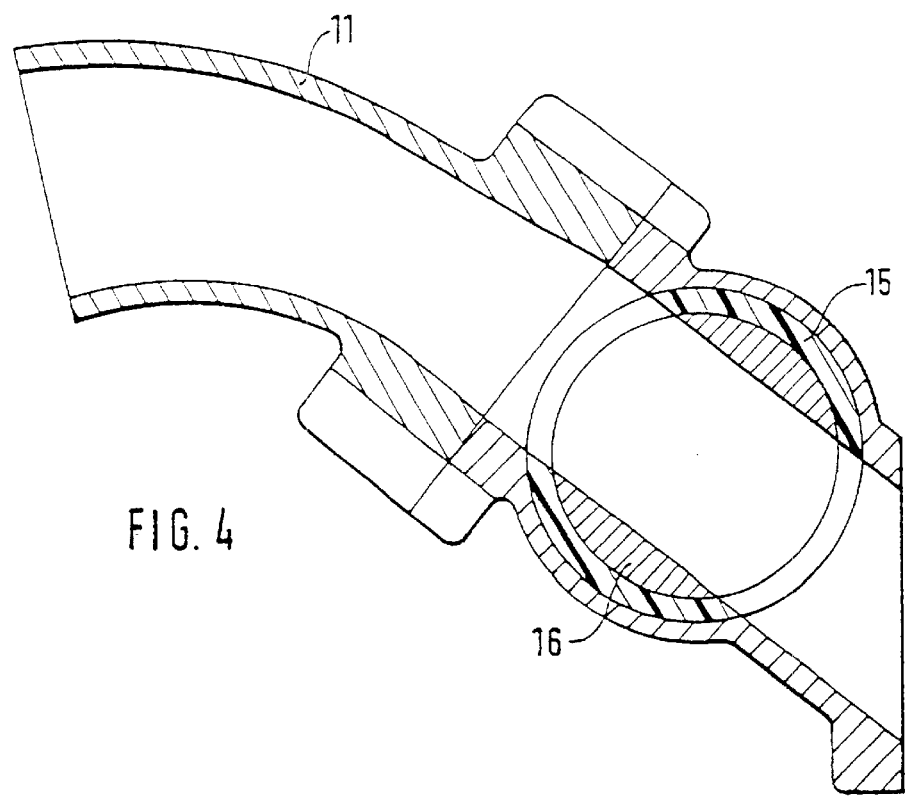
Figure 5:
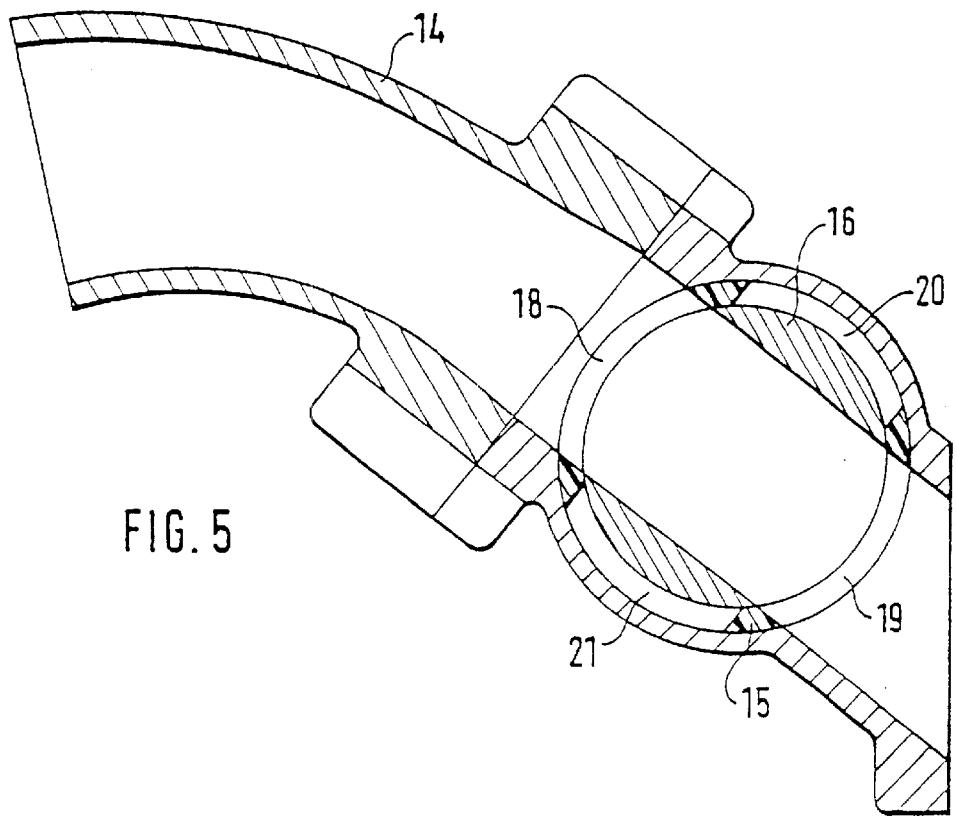
Figure 6:
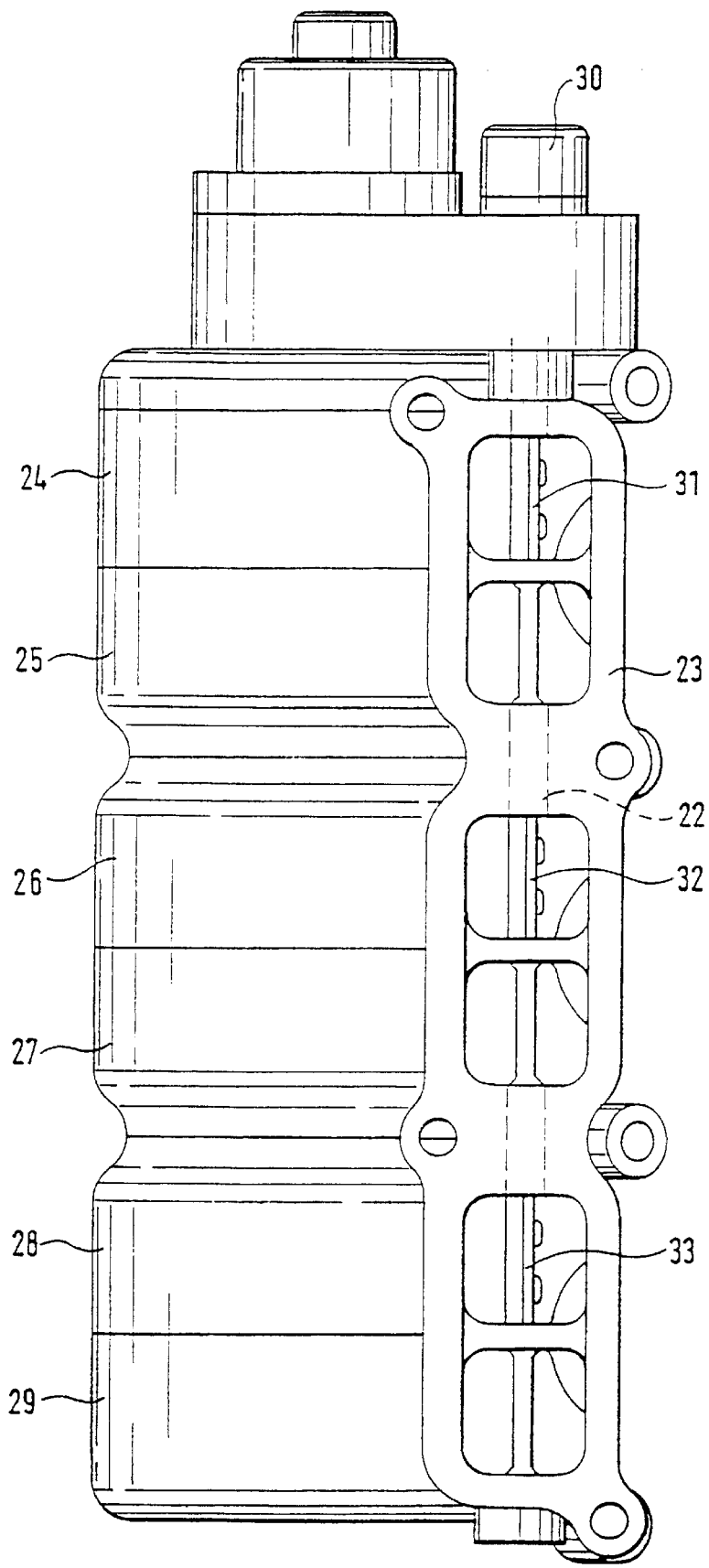

FIG. 2 a section through an end flange of an intake manifold in a second plane of section FIG. 3 the end flange of an air intake manifold with a closed passage FIG. 4 the end flange of an air intake manifold with the passage open FIG. 5 the end flange of an air intake manifold with an interrupted open passage FIG. 6 a drum controller with a valve.

Figure 7:
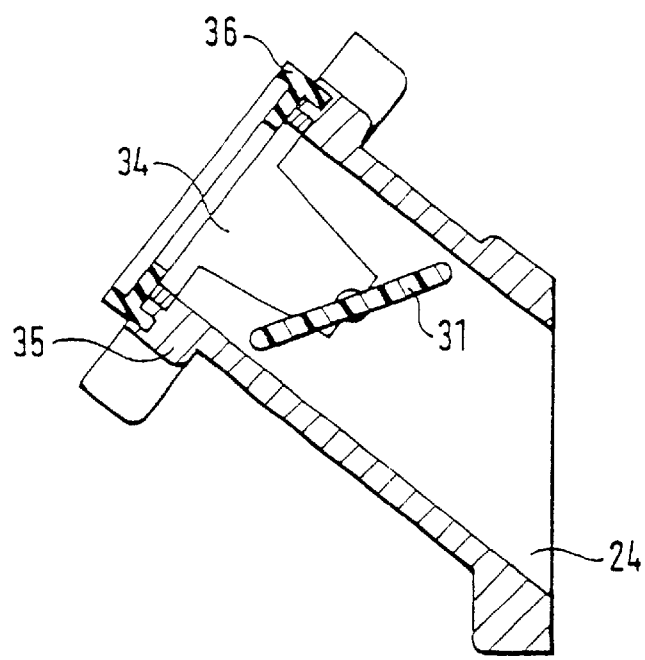

FIG. 7 shows a section through the single intake duct 24 showin in FIG. 6.

For the optimization of torque and power of an internal combustion engine, drum controllers 10 are inserted according to FIG. 1 into air intake ducts, with which the length of the intake duct can be varied. To produce a high torque, the air is aspirated from a long duct (torque duct). For high power and at high rotatory speed the air is aspirated from a short passage (power duct). The drum controller 10 has the purpose of opening or closing the power duct 11. The shape of the drum controller 10 matches the cross section of the intake duct and prevents the flow from being interrupted or impeded. If the drum controller 10 is to be used for shutting off the passage of a two-way intake duct, for example for a direct injector, a passage, as represented in FIG. 1, must be opened and closed and the second adjacent passage, according to FIG. 2, must remain open in both of the alternate positions. The contour 12 of the drum controller 10 has a negative influence on the flow, since here turbulence 13 or an interruption of the flow will occur.

FIG. 2 shows that the second passage (torque duct 14) has an unfavorable shape in every position of the drum controller 10.

FIG. 3 shows the possibility of using a drum controller 10 which consists of a moving control duct 15 and a fixed core 16 to close the power passage 11 without modifying the shape of the single intake ducts. In the view here shown the power passage 11 is closed by a corresponding position of the control duct 15.

FIG. 4 shows the opened power passage 11; control duct 15 and the core 16 are flush with each other.

FIG. 5 shows the torque duct 14. This torque duct is also penetrated by the core 16 and the drum controller 15. In the area of the torque duct 14 the drum controller 15 has both the openings 18 and 19 and the openings 20 and 21. This means that, in either position, that is, both in the closed and in the open position, the drum controller remains open and at the same time no disturbance of the shape of the passage occurs.

FIG. 6 shows a variant for the improvement of the mounting of a drum controller with valves placed on it. The drum controller 22 extends through a flange 23 in which the single intake ducts 24, 25, 26, 27, 28, 29, terminate. The drum controller 22 is driven by a driver 30; it bears flap valves 31, 32, 33, which here are shown in the open position, for closing the single intake ducts 24, 26, 28. The drum controller is tapered in the area of the single intake ducts 25, 27, 29, so that the flow in these passages will be largely uninfluenced. The individual flap valves 31–33 are fastened to the drum controller by screws or rivets, for example.

FIG. 7 shows a section through the single intake duct 24 shown in FIG. 6. The valve 31 is shown in a half-open position. The mounting of the valve is substantially facilitated by the fact that a mounting part 34 is provided on which both the drum controller 22 and the valves can be preassembled. The mounting part is inserted with the additional elements into the flange area 35 of the single intake ducts. A flange gasket 36, which is configured as a profile gasket, holds the mounting part 34 in the desired position and also provides a seal between the flange part 35 and the entire flange structure of the air intake duct system of a multiple cylinder internal combustion engine.

Of course, the possibility also exists for providing an intermediate flange to bear the mounting part 34 and the drum controller. This intermediate flange is also a pre-mounted component which can be inserted between the air intake duct system and a multiple cylinder internal combustion engine.

What is claimed is:

1. A drum controller for use in an air intake system for a multi-cylinder internal combustion engine with an intake manifold and individual intake ducts arranged side by side which terminate in a flange, said drum controller being disposed in a longitudinal bore of the individual intake ducts for closing and opening the individual intake ducts, wherein said drum controller is comprised of a movable control sleeve and a stationary core, and said drum controller closes or opens the individual intake ducts when the control sleeve rotates.

2. A drum controller according to claim 1, wherein said stationary core is connected at at least one end to the intake manifold.

3. A drum controller according to claim 1, wherein said stationary core is supported on bearing areas of the movable control sleeve.

4. A drum controller according to claim 1, wherein said air intake system includes a torque duct, and control sleeve is provided with openings which open into said torque duct in every position of the control sleeve.

5. A drum controller for use in an air intake system for a multi-cylinder internal combustion engine with an intake manifold and individual intake ducts arranged side by side which terminate in a flange; said drum controller being disposed in a longitudinal bore of the individual intake ducts for closing and opening the individual intake ducts, wherein said drum controller carries a plurality of valve flaps, and wherein a mounting part is connected to the drum controller for supporting the drum controller with the valve flaps positioned to open and close the individual intake ducts upon rotation of the drum controller.

6. A drum controller according to claim 5, wherein said mounting part is attached to an intermediate intake duct flange.

7. A drum controller according to claim 5, wherein said valve flaps are pre-assembled on the drum controller prior to insertion of the drum controller into the longitudinal bore of the individual intake ducts.

8. A drum controller according to claim 5, wherein said valve flaps are injection molded in place on the drum controller by assembly injection molding.

* * * * *